Oct. 12, 1937.  T. L. HEDGPETH  2,095,330
BENCH SAW
Filed July 25, 1936   2 Sheets-Sheet 1

Inventor:
Theron L. Hedgpeth
By Williams, Bradbury, McCaleb & Hinkle
Attys.

Oct. 12, 1937.                T. L. HEDGPETH                2,095,330
                                 BENCH SAW
                            Filed July 25, 1936         2 Sheets-Sheet 2

Inventor:
Theron L. Hedgpeth
By Williams, Bradbury,
McCaleb & Hinkle.
                    Attys.

Patented Oct. 12, 1937

2,095,330

UNITED STATES PATENT OFFICE 2,095,330

BENCH SAW

Theron L. Hedgpeth, Oak Park, Ill., assignor to Duro Metal Products Company, Chicago, Ill., a corporation of Illinois Application July 25, 1936, Serial No. 92,514

6 Claims. (Cl. 143—157)

The present invention relates to bench saws, and is particularly concerned with improvements in the saw guard, splitter, and devices for preventing kick-back of the lumber due to the reaction on the lumber from the rotating saw.

One of the objects of the invention is the provision of an improved guard and splitter arrangement by means of which a maximum protection is provided for the user of the bench saw and the saw is still accessible for repairs or other operations when the saw is not in operation.

Another object of the invention is the provision of an improved no-kick-back device which is adapted to positively prevent the saw from kicking back a piece of lumber after the piece has been sawed off from the main body of the work piece.

Another object of the invention is the provision of an improved no-kick-back device which is adapted to grip the work piece effectively without any possibility of marring the work piece or producing tooth marks, or any possibility of slippage.

Another object of the invention is the provision of an improved no-kick-back device which is adapted to be automatically arranged so that it will grip work pieces of different thicknesses without any new adjustment by the operator.

Another object is the provision of such a self-adjusting no-kick-back device for bench saws which is automatically drawn into closer contact with work pieces of various thicknesses by the force acting on the work piece.

Other objects and features of the invention will be apparent from the following description and from the accompanying drawings, in which similar characters of reference indicate similar parts throughout the several views.

Referring to the two sheets of drawings accompanying this specification,

Figure 1:
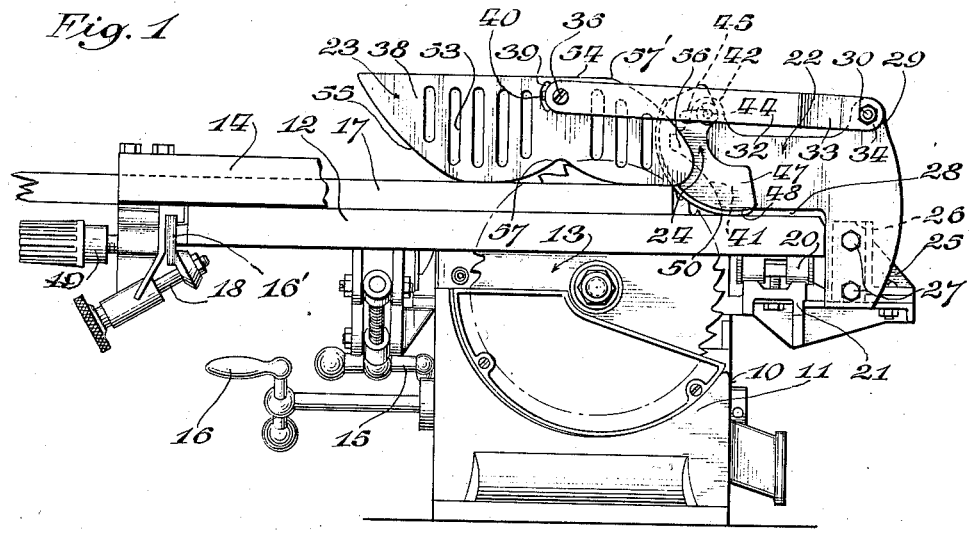
Fig. 1 is a side elevational view with parts of the mechanism broken away, showing a bench saw constructed according to the present invention.

Referring to Fig. 1, 10 indicates in its entirety a bench saw, which comprises the usual base 11, table top 12, circular saw 13, guide or fence 14, and the cranks 15 and 16 with their associated mechanisms for adjustment of the angularity of the table top and its elevation respectively.

The fence 14 is suitably supported upon a guide bar 16'; it extends parallel to the saw blade 13 for guiding the work piece 17; and it has a mechanism 18 for causing it to progress along the guide bar 16', and a clamping device 19 for securing it in any predetermined position.

The table 12 is supported on trunnions 20 for pivotal movement, and the same brackets which support bearings for the trunnions 20 also carry an extension for supporting the splitter 22, guard 23, and no-kick-back device 24. The bracket 21 carries an upwardly extending bracket 25 which may have a supporting flange 26 with a lateral surface located in a vertical plane.

Figure 3:
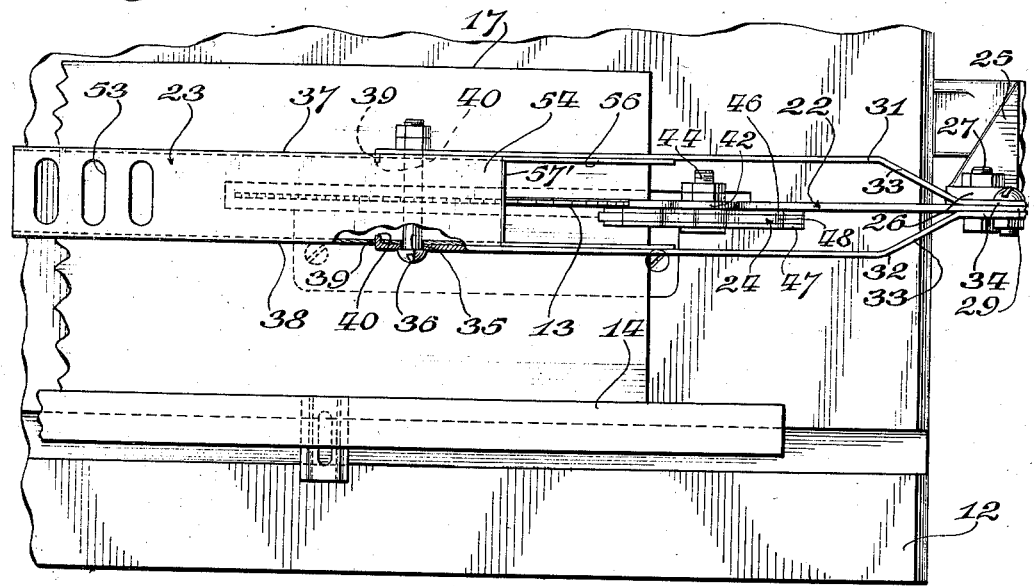
Fig. 3 is a fragmentary top plan view of the same devices, showing further details of construction.
Figure 4:
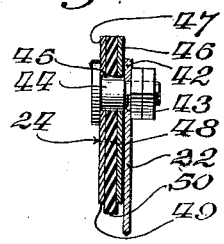
Fig. 4 is a sectional view, taken on the plane of the line 4—4 of Fig. 2, looking in the direction of the arrows.

This flange 26 is provided with a pair of apertures for receiving the screw bolts 27, the apertures being tapped to receive the threaded ends of the bolts, or the bolts passing through and being provided with nuts, as shown in Fig. 3.

The splitter 22 may then comprise a relatively thick sheet of steel or other suitable material which is bolted to the flange 26 by means of bolts 27. Splitter 22 has a downwardly extending portion with apertures for passing the bolts 27, and its main body portion extends in a horizontal direction and in a vertical plane over the table top 12, being slightly spaced therefrom at 28.

The clearance provided at 28 prevents the splitter 22 from interfering wth the pivotal movement of the table 12. The splitter is provided with an upwardly extending lug 29 having an aperture for receiving the screw bolt 30, which pivotally supports the two sheet metal arms 31, 32 that carry the guard 23. The sheet metal arms 31, 32 comprise relatively stiff strips of metal which are spaced from each other over the major portion of their length a distance equal to the width of the guard 23.

At the right end of Fig. 3 they are bent diagonally inward, thereby providing the offset portions 33, and they are again bent parallel to each other adjacent the splitter lug 29, thereby providing the attaching flanges 34.

The arms 31, 32 are provided with aligned apertures 35 for receiving the screw bolt 36, which passes through these arms and through the side flanges 37, 38 of the guard 23, thereby pivotally supporting the guard on the arms 31, 32.

The guard side flanges 37, 38 are provided with arcuate apertures 39 which extend on an arc, having the center at the axis of the screw bolt 36. Thus the guard 23 may move pivotally on the bolt 36, while the inwardly extending lugs 40 carried by the ends of the arms 31, 32 are located in the slots 39. The ends of the slots 39 and the lugs 40 form stop members for definitely determining the range of pivotal movement of the guard 23 on the arms 31, 32. These stop members prevent the guard from turning upside down or assuming any other position with respect to the arms 31, 32 than that which is necessary to bring the guard into proper guarding position with respect to the saw 13.

The whole guard may, however, be lifted upwardly with the arms 31, 32 pivoting about the bolt 30 so as to give access to the saw for observation, sharpening, or other reasons. The body of the splitter 22 extends forward toward the saw blade 13, but is spaced therefrom and may be provided with a partially circular border 41 adjacent the blade 13. The splitter is arranged so that its sides are substantially in the plane of the cutting edges of the saw teeth, but the splitter is slightly thicker than the slot which is cut by the saw so as to effectively relieve pressure on the saw by the parts of the work piece after they have passed the blade.

The saw blade 13 rotates counter-clockwise as shown in Fig. 1 and tends to push the work piece 17 toward the left in Fig. 1 against the direction of feed of the work piece, which is toward the right. The work piece 17 is customarily fed to the saw by taking hold of that part which is at the top of Fig. 3, and as the strip of lumber which is adjacent the fence 14 is cut off from the main body of the work piece 17, it passes out of control of the operator, who has hold of the main body of the work piece 17. Therefore, it becomes desirable, particularly as a part of the work piece is cut off, to have some device to prevent the loose part of the work piece from being kicked back by the reaction of the saw blade 13 against the work piece. Of course, this is also desirable during the feeding of the work piece, as it facilitates the steady feeding without the chance of the work piece being kicked back while the operator is moving his hand from one point to another on the piece of lumber.

The no-kick-back device 24 is preferably carried by the splitter 22, and for this purpose the splitter 22 has another upwardly extending lug 42 adjacent the left end of the splitter 22, in Fig. 1. This lug 42 has an aperture 43 for passing a screw bolt 44. The screw bolt 44, as well as screw bolts 30 and 36, is provided with suitable lock nuts, and it passes through a diagonal slot 45 located in the no-kick-back device 24.

The anti-kick-back device 24 preferably comprises a member having one or more metal supporting plates 46, 47 which are adapted to withstand the compression and other forces placed upon them, and these metal supporting plates may be spaced from each other and may support a resilient rubber sheet 48 which is adapted to engage the work piece.

The plates 46, 47 and the rubber sheet 48 may closely approximate each other in shape, but the rubber sheet 48 projects beyond the edges 49 of the plates at its edge 50 so that it is the rubber which comes into engagement with the lumber, and not the metal. The edges 49 of the metal plates are shown in the form of a curve of increasing radius with respect to the axis of the bolt 44, and the same is true of the edge 50 of the rubber sheet 48, except that that edge is preferably slightly spaced from the edges 49, since it extends beyond the edges of the metal plates.

This rubber engaging surface 50 of gradually increasing radius serves to adapt the anti-kick-back device 24 to lumber of different thicknesses, and it greatly increases the range of usefulness of the anti-kick-back device. The force exerted on the work piece by the saw blade acts in the direction of the arrow 51 in Fig. 2, and as the rubber edge 50 engages the lumber, the anti-friction characteristic of the rubber against the wood prevents slippage and causes the no-kick-back device 24 to be drawn into closer engagement with the lumber by the action of the force 51.

Figure 2:
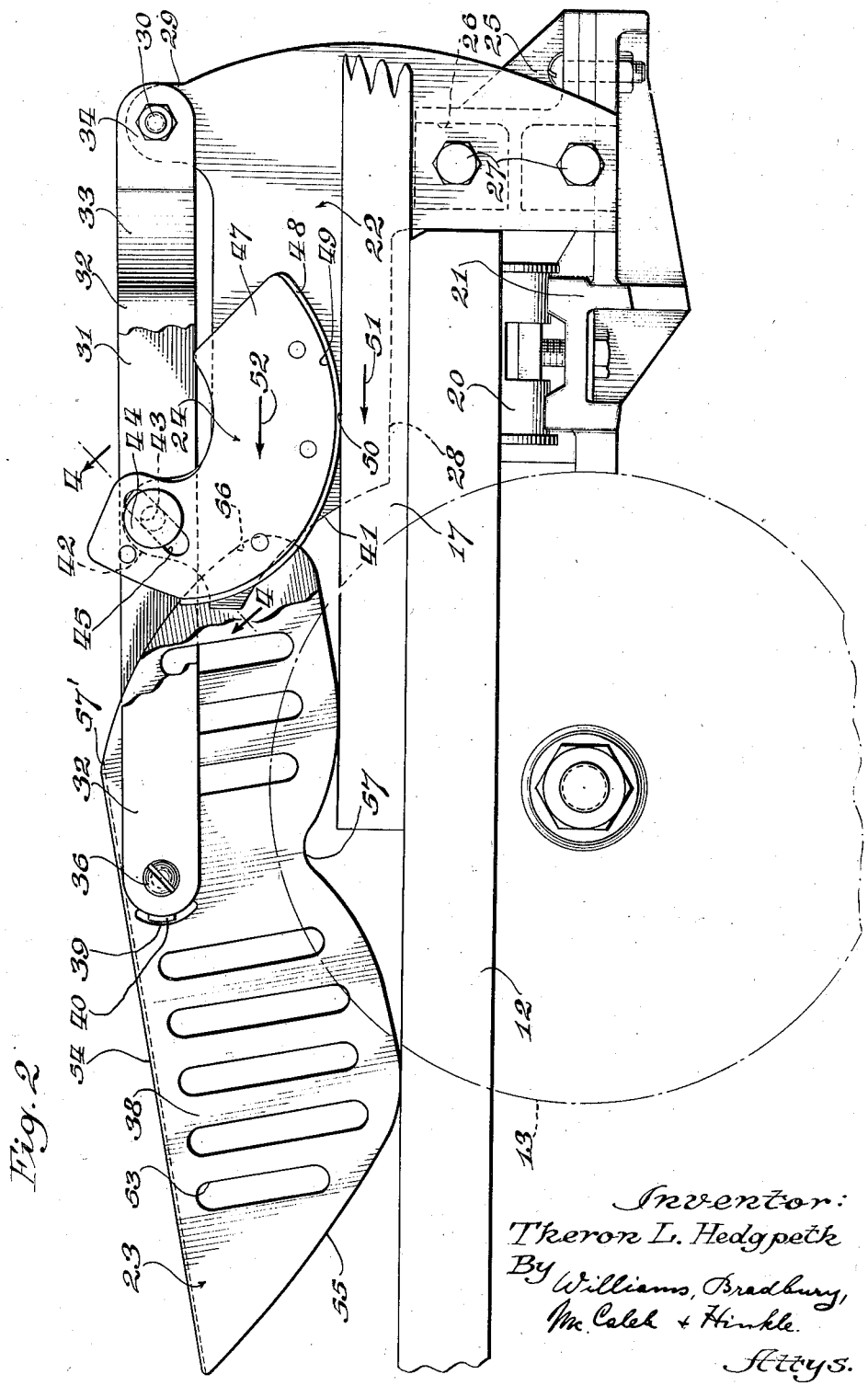
Fig. 2 is a larger fragmentary view of the guard, splitter, and no-kick-back device, showing the details of construction of these improvements.

In order to still further accentuate the gripping action and self-adjusting action of the anti-kick-back device 24, it has the slot 45 slidably receiving the body of the bolt 44 and the slot 45 extends diagonally upward toward the right in Fig. 2. The force acting on the no-kick-back device 24 also acts toward the left in Fig. 2, and tends to drive the walls of the slot 45 downward on the body of the bolt 44, further tending to cam the member 24 downward into engagement with the lumber.

The member 24, however, seeks a position which is determined by the thickness of the lumber, and there it is urged into gripping relation with the lumber by virtue of the diagonal position of the slot 45, the pivotal movement of the member 24, and the increasing radius of the edge 50.

It will thus be observed that the anti-kick-back device is adapted to adjust itself diagonally to any thickness of lumber within a predetermined range, and it automatically grips the lumber without marring it and prevents it from moving backward across the saw table toward the operator.

The guard 23 comprises a sheet metal member which may be provided with slots 53, permitting a view of the saw and the work piece through the guard, and it comprises the side flanges 37, 38 which are joined together by the yoke 54 at the top. The side flanges 37, 38 are curved at 55 so as to present a camming surface to the forward edge of the work piece, and the work piece will cam up the guard as it approaches the guard if the guard is resting on the table.

The side flanges 37, 38 are provided with tails 56 which extend beyond the yoke 54, since the yoke 54 terminates at the point 57', and the tails 56 provide better protection, since they cover the saw blade when it is projected to its most extreme position above the table.

The lower edges of the side flanges 37, 38 may be curved upward into a form of groove 57 at a point which corresponds to the axis of the saw shaft when the guard pivots downward toward the saw shaft, due to a lowering of the table. This groove formation 57 permits the guard to come down closer to the saw and it also permits a view of the saw blade at that point.

It will thus be observed that I have invented an improved splitter, guard, and anti-kick-back structure which may be constructed of sheet metal so that it lends itself to manufacture by stamping and punching operations, and it may be produced at a low cost.

My anti-kick-back device is adapted to adjust itself automatically to any thickness of lumber and to grip the lumber in this adjusted position automatically so as to positively prevent the work piece from being kicked back toward the operator or to prevent a backward feed. It is also adapted to effect this result without any possibility of marring the lumber, since it does not have any metallic teeth, but is provided with a soft resilient rubber member for engaging the surface of the wood.

The rubber edge 50 is also adapted to be deformed to correspond to the shape of the surface of the work piece and to change its flat surface to any curved contour on the work piece and also to change its normally horizontal flat surface to a diagonal flat surface parallel to the top of the work piece or to the top of the table when the table is tilted. The anti-kick-back device being mounted on the splitter, which is mounted on the bearings for the trunnions for the table, it will be observed that the anti-kickback device always extends in a vertical plane, but nevertheless it effectively engages pieces of work which are held in planes other than a horizontal plane by the table top when the table top is tilted, due to the fact that the rubber surface conforms to the surface of the material which is being gripped.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a bench saw, the combination of a base with a saw table and a saw, a splitter carried by the base and extending into a position adjacent the saw blade, an arm pivotally mounted on the splitter, a guard pivotally mounted on the arm, said guard having means for definitely limiting its pivotal movement with respect to the arm, and an anti-kick-back device pivotally mounted on the splitter and adapted to adjust itself automatically to work pieces of different thicknesses, said anti-kick-back device comprising a metallic plate of increasing radius provided with a rubber engaging member for engaging the work piece.

2. In a holding device for wood working tools, the combination of a table with a support for said table, said support also carrying a pivotal supporting member, said pivotal supporting member supporting a holding device, said holding device comprising a pair of metal plates secured together in spaced relation to each other, with a non-metallic layer between said plates, said plates being formed with said non-metallic layer projecting beyond its edge adjacent said table, and said non-metallic layer being formed with an edge of increasing radius toward the back of the machine, whereby the holding device is adapted to be drawn into tighter engagement with a work piece by the action of the wood working tool, which tends to draw the work piece from the back of the table toward the front.

3. In a holding device for wood working tools, the combination of a table with a support for said table, said support also carrying a pivotal supporting member, said pivotal supporting member supporting a holding device, said holding device comprising a pair of metal plates secured together in spaced relation to each other, with a non-metallic layer between said plates, said plates being formed with said non-metallic layer projecting beyond its edge adjacent said table, and said non-metallic layer being formed with an edge of increasing radius toward the back of the machine, whereby the holding device is adapted to be drawn into tighter engagement with a work piece by the action of the wood working tool, which tends to draw the work piece from the back of the table toward the front, said metal plates being riveted together, and said non-metallic layer comprising a sheet of resilient rubber adapted to give and hold a work piece irrespective of the shape of its adjacent surface.

4. In a holding device for wood working tools, the combination of a table with a support for said table, said support also carrying a pivotal supporting member, said pivotal supporting member supporting a holding device, said holding device comprising a pair of metal plates secured together in spaced relation to each other, with a non-metallic layer between said plates, said plates being formed with said non-metallic layer projecting beyond its edge adjacent said table, and said non-metallic layer being formed with an edge of increasing radius toward the back of the machine, whereby the holding device is adapted to be drawn into tighter engagement with a work piece by the action of the wood working tool, which tends to draw the work piece from the back of the table toward the front, said holding device having a diagonally upwardly and backwardly extending slot engaging said pivotal support whereby the holding device is adapted to be used on work pieces of different thickness.

5. In a holding device for wood working tools, the combination of a table with a support for said table, said table being movably mounted on said support for tilting it to any of a plurality of predetermined angles, with a holding device pivotally mounted on said support, said device comprising a metal support having an edge of cam shape formed according to an increasing radius with respect to a predetermined center, said metal plate supporting a resilient, non-metallic work-engaging member adapted to be deformed upon engagement with the work and to grip the work, irrespective of the angle of tilt of the table with respect to said support and said holding device, said holding device being drawn into tighter engagement with the work piece by motion of the work piece from the back of the table toward the front, by virtue of the fact that the radius of the cam surface of said holding device increases toward the back of said table.

6. In a holding device for wood working tools, the combination of a table with a support for said table, said table being movably mounted on said support for tilting it to any of a plurality of predetermined angles, with a holding device pivotally mounted on said support, said device comprising a metal support having an edge of cam shape formed according to an increasing radius with respect to a predetermined center, said metal plate supporting a resilient, non-metallic work-engaging member adapted to be deformed upon engagement with the work and to grip the work, irrespective of the angle of tilt of the table with respect to said support and said holding device, said holding device being drawn into tighter engagement with the work piece by motion of the work piece from the back of the table toward the front, by virtue of the fact that the radius of the cam surface of said holding device increases toward the back of said table, said holding device being provided with a slot engaging said pivotal mounting, and said slot having a diagonally upward and backward slope with respect to said table, whereby the force applied to said holding device by a work piece tends to force the holding device downward on its pivotal mounting in said slot.

THERON L. HEDGPETH.